Feb. 3, 1970   W. SCHUSTER   3,492,768
RESILIENT SUPPORT
Filed April 10, 1968   5 Sheets-Sheet 1
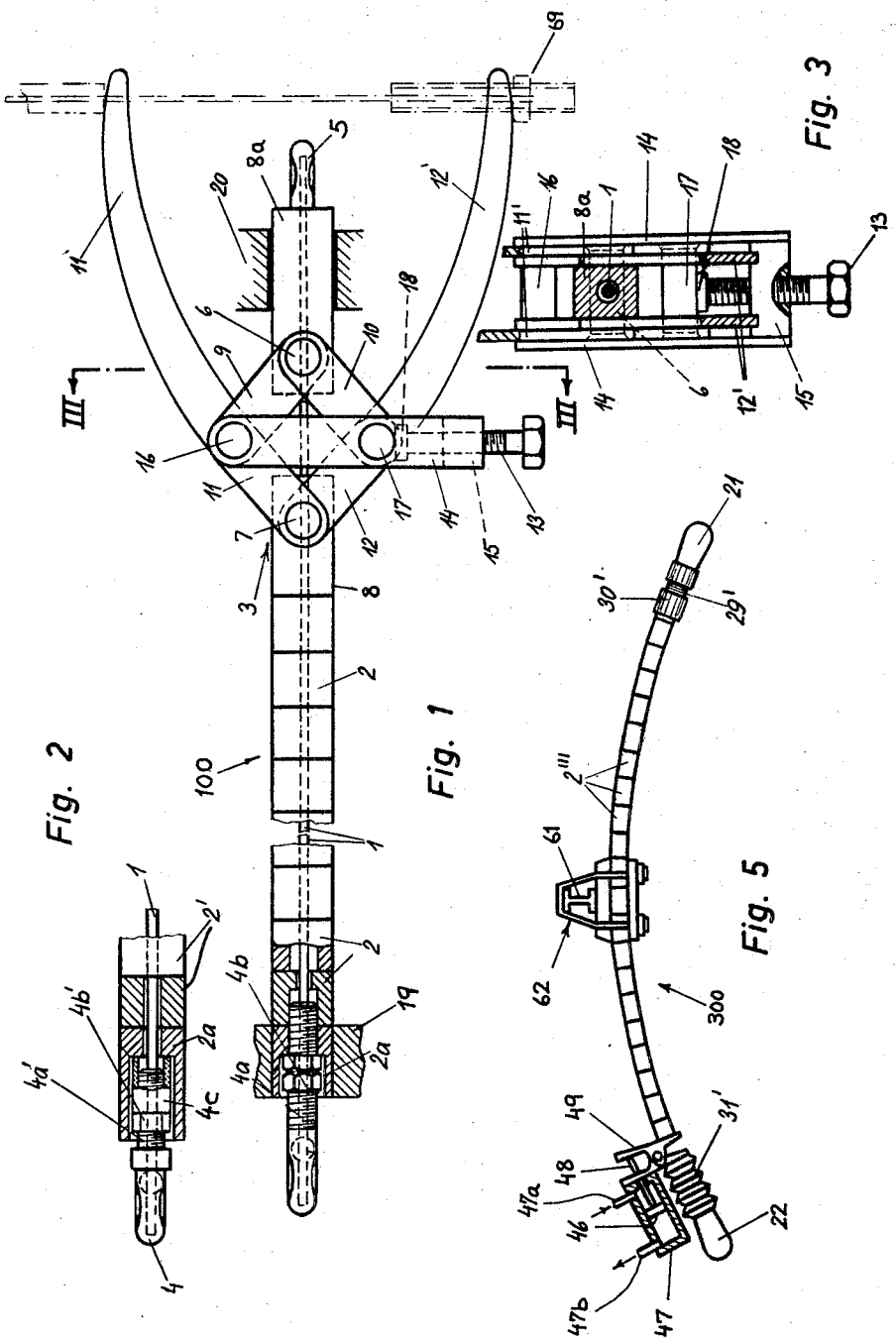
INVENTOR.
WILHELM SCHUSTER
BY
Karl F. Ross
ATTORNEY

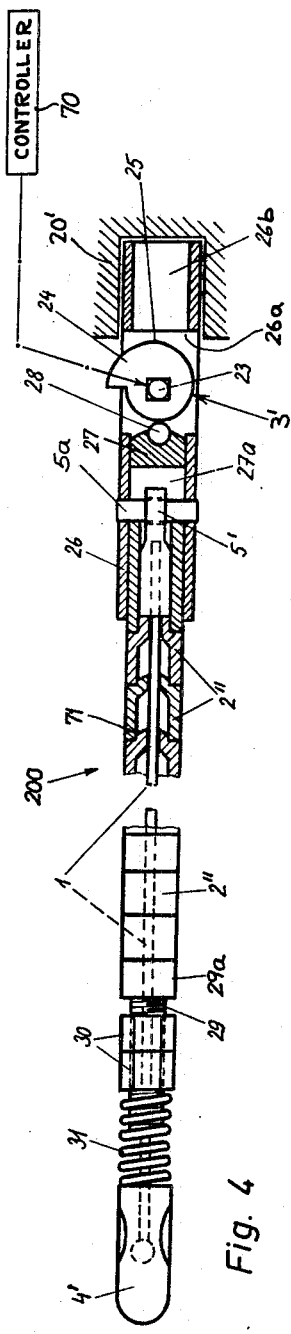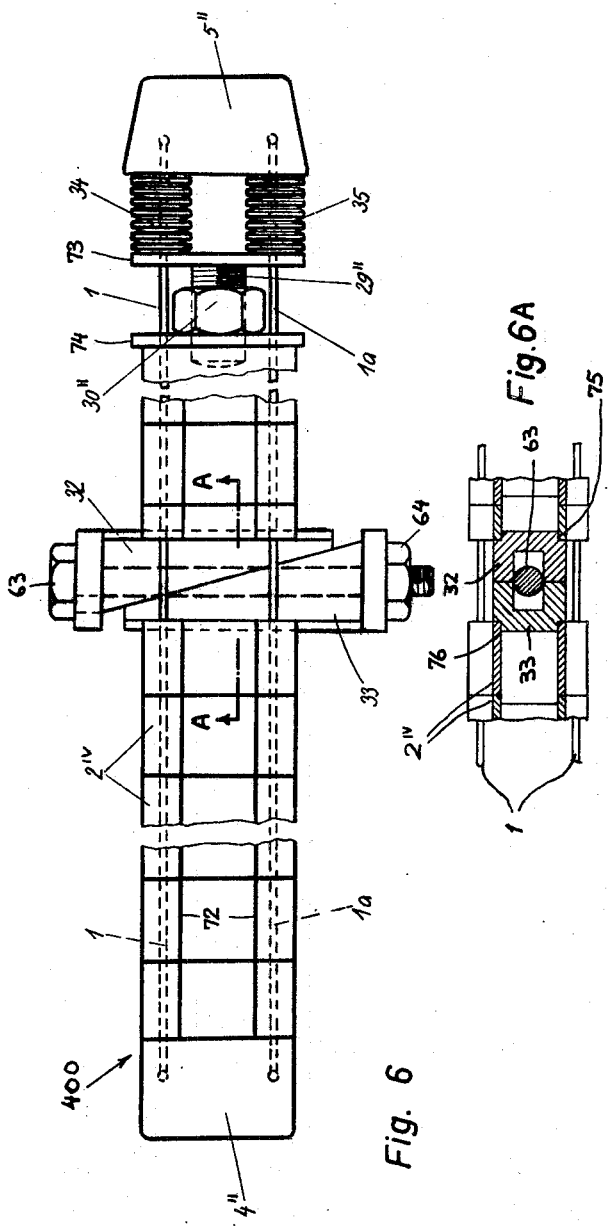

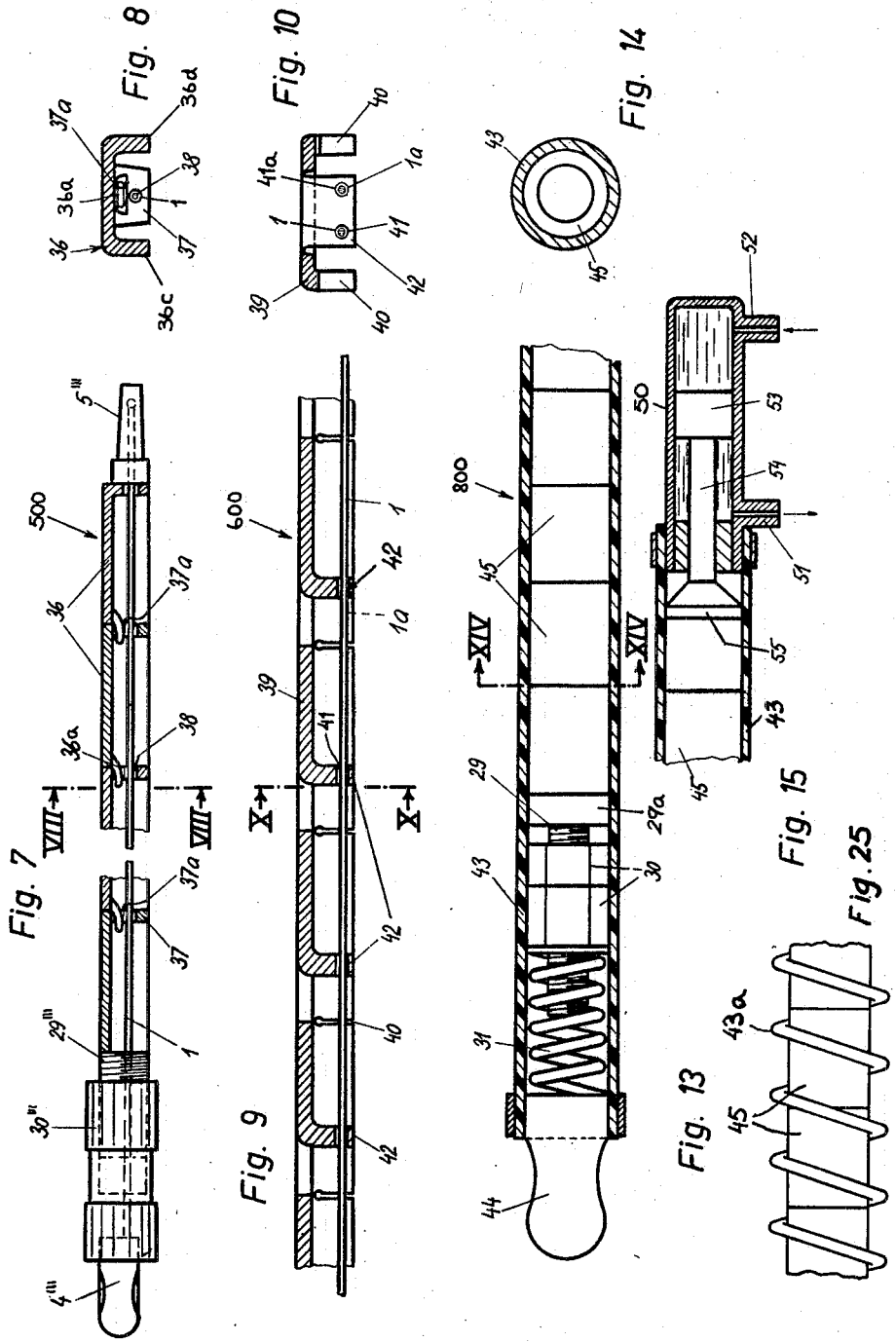

Feb. 3, 1970 W. SCHUSTER 3,492,768
RESILIENT SUPPORT
Filed April 10, 1968 5 Sheets-Sheet 4
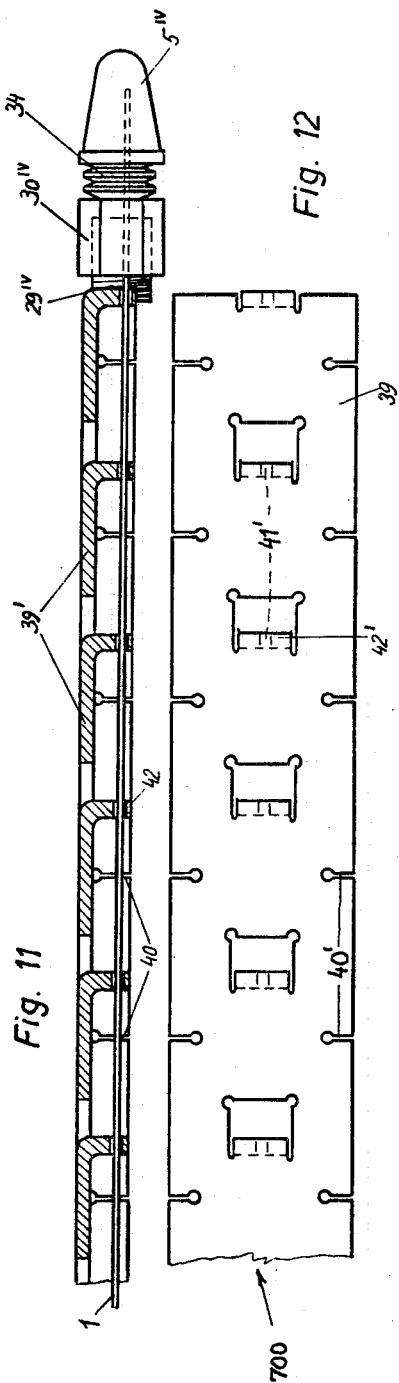
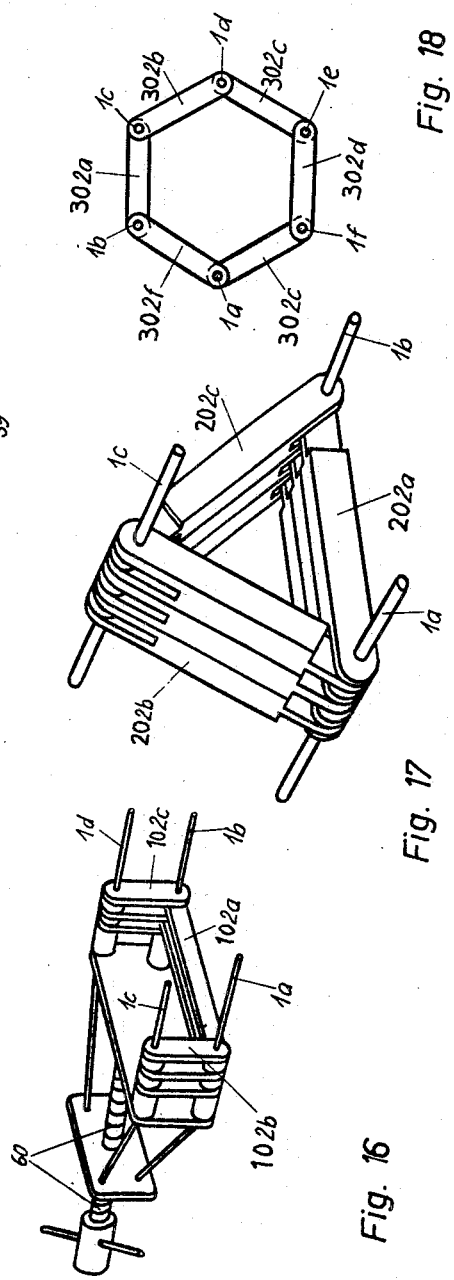
INVENTOR.
WILHELM SCHUSTER
BY
ATTORNEY

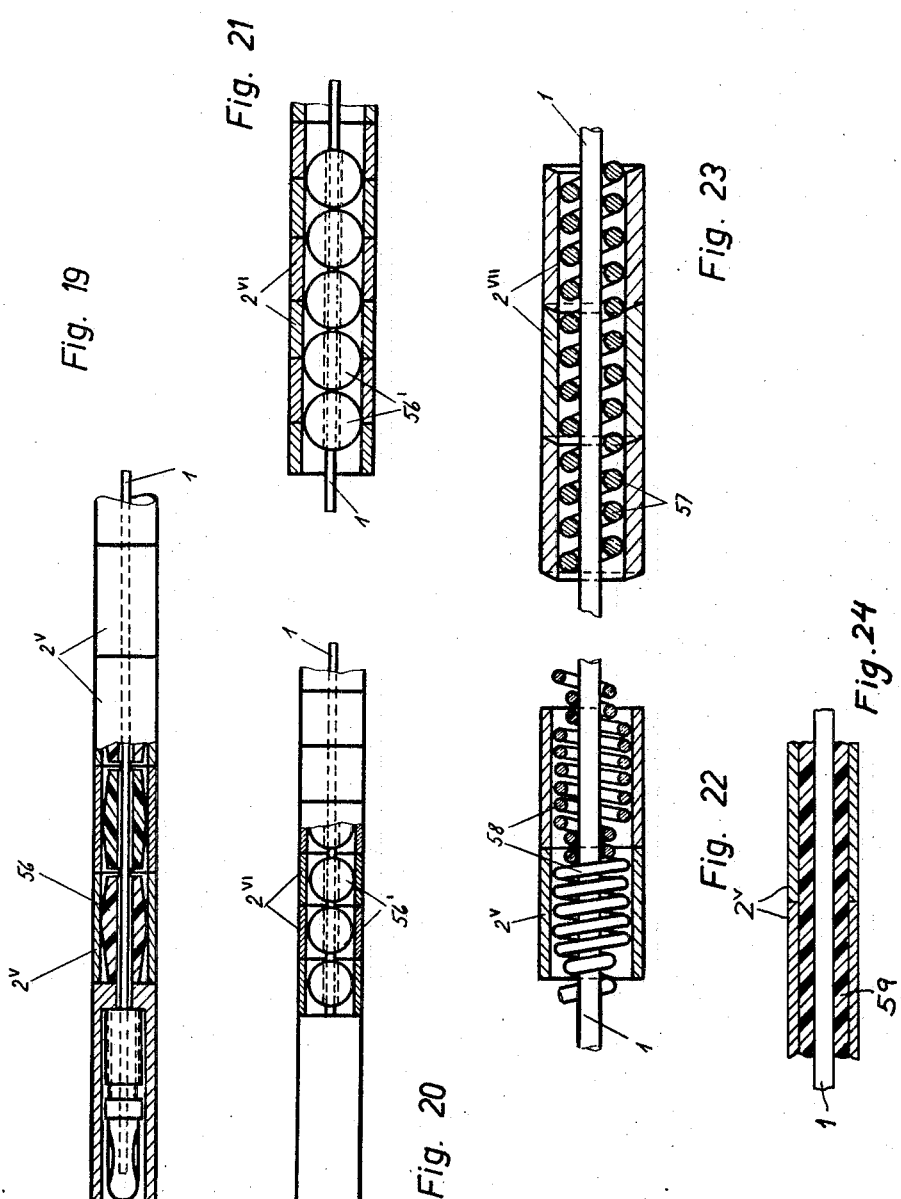

United States Patent Office 3,492,768
Patented Feb. 3, 1970

3,492,768
RESILIENT SUPPORT
Wilhelm Schuster, Neubauzeile 57, Linz (Danube),
Oberosterreich, Austria
Filed Apr. 10, 1968, Ser. No. 720,069
Claims priority, application Austria, Apr. 11, 1967,
3,419/67
Int. Cl. E04b 1/343; E04h 12/18
U.S. Cl. 52—98                                    8 Claims

ABSTRACT OF THE DISCLOSURE

Resilient, beam-like supporting member with an elongate body composed of a multiplicity of abutting or integrally joined body sections, a coacting tension element such as a traversing cable or wire or a surrounding hose or coil spring, and mechanism in line with the body sections for adjustably stressing same against the tension element with consequent variation of the resiliency, flexural strength and related characteristics of the member.

My present invention relates to a resilient support for a load-bearing or otherwise stress-absorbing structure, such as a mattress, seat cushion or the like as described in my copending application Ser. No. 699,553, filed Jan. 22, 1968, or for any other assembly in which a load bears upon a beam or similar rigid, generally horizontal structural member.

In such construction it is frequently desirable to be able to modify the flexural strength, the resiliency, the damping factor and related characteristics of a load-bearing member acting as a simply supported or cantilevered beam. Such readjustments may be necessary, for example, in bridges of floors which have to be strengthened for increased loads or which have developed a tendency to sag because of fatigue or by reason of changes in an associated framework.

It is, therefore, the general object of my invention to provide, in a load-bearing structure of the general type described, a rigid yet elastic supporting member having means for modifying its aforestated characteristics under conditions of use, either by manual adjustment or by some form of automatic control.

A particular field of utility for an adjustable structural member of this kind is in the design of automotive vehicles whose chassis, when constructed from or incorporating such adjustable members, may be readily adapted to different loading and operating conditions, e.g. by a reduction of their stiffness and consequent enhancement of shock absorption for driving at higher speeds and/or over bumpy roads. A related field is the use of such members as vehicular bumpers which are to be stiffened as the velocity increases.

Thus, a more particular object of this invention is to provide a structural member, for use in automotive vehicles or other machinery, whose resiliency, flexibility etc. can be instantly adjusted by a mechanical connection to a tachometer or similar automatic controller.

In accordance with my present invention I provide a rigid elongate member mounted on a pair of end supports, or cantilevered on a single support, to serve as part of a stress-absorbing structure, the member consisting essentially of a multiplicity of adjoining body sections cooperating with at least one elongated flexible tension element extending either through or around the row of body sections from one end of the row to the other. A resilient axial force, tending to compress the body sections, is applied to these sections by the tension element and/or by an interposed compressible link; the magnitude of this force is adjustable by a stressing device in line with the body sections, e.g. a pantograph-type coupling as disclosed in my aforementioned copending application.

In several prior U.S. patents, such as Nos. 3,295,269, 3,312,020, 3,314,200 and 3,349,526, I have disclosed similar combinations of tension elements and body sections which, however, were used to form a collapsible structure rather than a rigid structural member of adjustable stiffness. Moreover, these collapsible structures were not intended or suitable as a beam-like load carrier or shock absorber mounted generally horizontally on one or more supports.

According to a more particular feature of my invention, an inserted compressible link (e.g. a coil spring or a stack of Belleville washers) has a resilient force sufficient to resist axial compression under normal loading conditions but designed to yield in response to extraordinary stresses; this link may also be inelastic but relatively brittle so as to disintegrate in response to a compressive force exceeding a predetermined threshold. Moreover, if the stressing device includes a pneumatically or electromagnetically actuatable pressure source, this device can also serve as a yieldable buffer to relieve the stress in the case of overload. A destructible buffer will be useful, for example, in the case of vehicular bumpers, being replaceable at low cost after a collision.

The invention will be described in greater detail hereinafter with reference to the accompanying drawing in which:

FIG. 1 is a side-elevational view, partly in section, of an assembly including a rigid supporting member according to the invention;

FIG. 2 is a partly sectional side-elevational view of a modified end portion of the member of FIG. 1;

FIG. 3 is a front view of a stressing mechanism for the structure of FIG. 1, taken on the line III—III thereof;

FIG. 4 is a view similar to FIG. 1, illustrating a modified stressing mechanism;

FIG. 5 is a side-elevational view of a supporting member representing an alternate embodiment;

FIG. 6 is a top view of still another supporting member according to the invention;

FIG. 6A is a cross-sectional view taken on the line A—A of FIG. 6;

FIG. 7 is a side-elevational view, partly in axial section, of a further supporting member embodying the invention;

FIG. 8 is a cross-sectional view taken on the line VIII—VIII of FIG. 7;

FIG. 9 is a fragmentary view, in axial section, of a member generally similar to that of FIG. 7.

FIG. 10 is a cross-sectional view taken on the line X—X of FIG. 9.

FIG. 11 is a view similar to FIG. 9, illustrating part of still another embodiment;

FIG. 12 is a fragmentary top view of the supporting member of FIG. 11;

FIG. 13 is a partial axial sectional view of yet a further supporting member according to the invention;

FIG. 14 is a cross-sectional view taken on the line XIV—XIV of FIG. 13;

FIG. 15 is a view similar to FIG. 13, showing the opposite end of the structure thereof;

FIGS. 16 and 17 are perspective views of parts of other structures embodying the principles of my invention in modified form;

FIG. 18 is an end view of a further structural member adapted to be used in an assembly according to the invention;

FIGS. 19 and 20 are side-elevational views, partly in section, of portions of supporting members according to the invention provided with internal spacers;

FIG. 21 is an axial section view similar to FIG. 20, showing a different positioning of the spacers thereof;

FIGS. 22 and 23 are further views similar to FIG. 21, showing yet other types of spacers;

FIG. 24 is a view similar to FIG. 23, illustrating a further modification; and

FIG. 25 is a fragmentary side-elevation view representing a modification of the structure of FIG. 13.

In FIG. 1 I have shown a simply supported beam comprising a pair of end supports 19, 20 for an elongate structural member generally designated 100. The member 100 consists essentially of a multiplicity of hollow body sections 2 which, as shown, are generaly cup-shaped with a central bore in the bottom of the cup; this bore is traversed by a wire or cable 1, e.g. of steel, having a certain resiliency. The ends of cable 1 are anchored to two thermal elements 4a and 5, element 4a having a threaded shank which passes through a slightly longer end section 2a with widened bore and partly extends into the interior of the next body section 2. Nuts 4b threadedly engage the shank of element 4a and bear upon an internal shoulder of element 2a. The connection between cable 1 and terminals 4a, 5 may be insured by soldering, welding, threading, clamping or other suitable means.

Interposed between the column of body sections 2 and the terminal element 5 are two axially spaced sleeves 8 and 8a which, as illustrated in FIG. 3, are prismatic blocks of substantially square profile; body sections 2 and 2a may have the same profile but could also be cylindrical. A stressing mechanism for the exertion of axial pressure upon the member 100, generally designated 3, comprises a pantograph-type coupling with four articulated links 9, 10, 11 and 12, each link being constituted by a paid of symmetrical arms as best seen in FIG. 3. The junctions of these links are formed by four pins 6, 7, 16 and 17; pins 6 and 7 are in line with the axis of member 100 and are perforated to give passage to the cable 1, these pins also traversing the blocks 8a and 8, respectively, whereas pins 16 and 17 lie on a line perpendicular to the axis and are interconnected by a pair of arms 14 which are rigid with a square nut 15. The latter is threadedly engaged by a screw 13 terminating in a broadened foot 18 which bears upon the pin 17, rotation of the screw 13 in a tightening sense thus tending to foreshorten the diagonal 16–17 and to lengthen the diagonal 6–7 so as to increase the contact pressure between nuts 4b and body section 2a. This increase in axial pressures can also be brought about with the aid of an actuator 69, such as a Bowden wire, bearing upon extensions 11', 12' of links 11 and 12 so as to exert an increased leverage upon the device 3. In this case the screw 13 may be used as a limiting abutment or as a backstop to hold the structure in a position of stress established by operation of the actuator 69.

In assembling this structure, screw 13 is completely retracted to let the block 8 approach the block 8a sufficiently to expose the nuts 4b which can then be locked against each other at a suitable location along the shank of terminal 4a. Next the link extensions 11', 12' are moved substantially into the illustrated position so that the right-hand nut 4b contacts the shoulder of body section 2a, further stressing resulting in a tensioning of the resilient cable 1. Thus, the desired degree of stiffness may be imparted to member 100 by the actuator 69 and/or a setting screw 13.

In FIG. 2 I have shown a modification of the left-hand portion of the assembly of FIG. 1 in which a separate bolt 4a', abutting a terminal element 4, is axially traversed by the cable 1 and penetrates partly into a sleeve 4c lodged in the interior of end section 2a. Sleeve 4c, which is under axial pressure from a nut 4b' on bolt 4a', consists of a relatively brittle material which collapses in response to a predetermined axial pressure so as to slacken the cable 1 under overload or excessive impact; this collapsible insert on buffer may consist of cellular polystyrene or similar crushable material.

FIG. 4 illustrates a modified supporting member 200 which differs from member 100 of FIG. 1 by a slightly altered shape of its body sections 2", the latter being formed with axial bosses 71 fitting into the recesses of adjoining sections for a more positive interengagement. Also, a compression spring 31 has been inserted between a terminal element 4' and a pair of nuts 30 engaging a bolt 29, which partly extends into the spring 31; the head 29a of bolt 29, which is axially traversed by the cable 1, bears upon an adjacent body section 2". The opposite terminal element 5" is traversed, beyond the end of cable 1, by a pin 5a anchored to a sleeve 26 in which a pressure element 27 is axially slidable, this element having a cutoff 27a to accommodate the pin 5a and the end of terminal element 5'. A ball-shaped point 28 of element 27 is held in contact, under the pressure of spring 31, with the periphery of a rotary cam 24 forming part of a stressing mechanism 3'; cam 24 is seated on a square shaft 23 with rounded extremities journaled in the sides of sleeve 26 which is cut away at 26a to provide clearance for the cam 24. The free end 26b of the sleeve is lodged in a mounting 20' supporting the member 200 in the manner of a cantilevered beam.

It will be apparent that clockwise rotation of cam 24 from its illustrated position will shift the pressure element 27 to the left, together with the column of body sections 2", so as to increase the compression of spring 31 and with it the stiffness of member 200. This adjustment may be performed manually, e.g. with the aid of a tool engaging a projecting extremity of shaft 23, or automatically by means of a controller 70. In the specific case in which the assembly 3', 200 is used in an automatic vehicle, e.g. as part of its chassis or of a shock absorber, the controller 70 may be a centrifugal governor responsive to the speed of the engine or of a wheel axle. This type of control can, of course, also be used in connection with the preceding embodiment, to actuate the Bowden cable 61 of FIG. 1, or in conjunction with other embodiments described hereinafter.

In FIG. 5 I have illustrated a member 300 which is generally similar to members 100 and 200 but whose body sections 2''' are slightly trapezoidal in outline, abutting one another along the sides of the trapezoids which converge in the same direction, i.e. downwardly in this figure, so as to impart an arcuate shape to the structure. The upwardly cambered beam 300 thus formed is shown secured, by a coupling 62, to a transverse I-beam 61 which may form part of a vehicular frame or a larger structure (e.g. a building, bridge or roadway). A stress-presetting insert 29' and 30', similar to the elements 29 and 30 of FIG. 4, is interposed between the column of sections 2''' and an associated terminal element 21, with the bolt 29' again partly extending into the first body section. A stack of Belleville washers 31' is inserted between the other end of the column and a second terminal element 22, in series with a stressing mechanism here shown to control the jaws of a pair of tongs 49 which are spreadable by a hydraulic or pneumatic actuator comprising a cylinder 47 and a piston 46 with rod 48. Operating fluid may be admitted into the cylinder at 47a and withdrawn at 47b to stiffen the member 300.

The Belleville washers 31', like the spring 31 of FIG. 4, may be so biased as to yield only in response to excessive loads or impact, thus taking the place of the disposable insert 4c of FIG. 2. With pneumatic rather than hydraulic operation of actuator 46–49, the stack may also be omitted since the compressible operating fluid in cylinder 47 can take over its function. Similar results may be obtained by the use of a relief valve in conduit 47b with either pneumatic or hydraulic operation. It will also be apparent that a solenoid-type actuator, if substituted for the fluid-actuated stressing device of FIG. 5, would function in an analogous manner.

FIGS. 6 and 6A represent a modified supporting member 400 whose body sections $2^{iv}$ have been broadened to accommodate two pairs of parallel cables 1 and 1a passing through lateral beads 72 thereof. These cables are anchored at one end to a terminal block 4" and at the opposite end to a similar element 5" bearing upon two pairs of Belleville stacks 34, 35 each traversed by a respective cable 1, 1a. A cross-plate 73, receiving the thrust of the Belleville washers, forms the head of a presetting bolt 29" engaged by a nut 30" which bears through another cross-plate 74 upon the first body section $2^{iv}$, substantially as shown in the preceding embodiment.

The body sections 2–4 are provided with interfitting formations including recesses 75, 76 which slidably accommodate a pair of wedges 32, 33 held together by a bolt 63 and a nut 64, the bolt extending at right angles to the cables 1 and 1a which pass above and below the wedges 32, 33. Upon a tightening of bolt 63 and nut 64, the wedges 32, 33 are moved toward each other to spread apart the adjoining body sections $2^{iv}$, thereby increasing the axial stress of member 300.

FIGS. 7 and 8 illustrate a supoprting member 500 wherein the individual body sections 36 are channel-shaped, their profile including a horizontal web 36b and a pair of depending flanges 36c, 36d. Between these flanges there is also provided a depending tab 37 having a cutout 37a just above a central perforation 38 for the passage of cable 1. Cutout 37a accommodates a lug 36a of an adjoining body section to help maintain the alignment of these sections and to prevent their relative rotation. Cable 1 is anchored to a pair of terminal elements 4''', 5''' with interposition of a prestressing means 29''', 30''' as previously described. A stressing mechanism, not shown, may of course also be included as in the embodiments described above.

FIGS. 9 and 10 show a generally similar member 600 wherein, however, the body sections 39 are all integrally formed from a common strip of metal or plastic material having substantially the same profile as the sections 36 of FIGS. 7 and 8. These sections 39 are separated by notches 40 in their depending flanges, the widths of the notches depending upon the desired curvature or camber, if any, to be imparted to the structure 600. Depending tabs 42 here support a pair of parallel cables 1, 1a which pass through respective perforations 41, 41a thereof.

A generally similar structure 700 is shown in FIGS. 11 and 12, with the difference that the notches 40' separating adjacent body sections 39' extend past the depending flanges into the web portion of the strip. Tabs 42' are shown to have only one hole 41' each for the passage of a single cable 1. This cable, as seen in FIG. 11, is anchored at one end to a terminal $5^{iv}$ after traversing a bolt-and-nut assembly $29^{iv}$, $30^{iv}$ and a Belleville stack 34. The opposite end of the cable may again be tensionable by an actuating mechanism of one of the types previously described.

The continuous structures of FIGS. 9–12 are particularly adapted for use as bumper strips or other vehicular constituents of adjustable resiliency and flexural strength.

FIGS. 13–15 show a structure 800 whose body sections 45, which are shown as tubular but may also be solid, are held together by a flexible and preferably elastic hose 43 enveloping these sections. The sections 45 together with a prestressing assembly 29, 29a, 30 and a compression spring 31 are interposed between the body of member 800 and a terminal element 44. At the opposite end of the structure, a hydraulic or pneumatic actuator comprising a cylinder 50 and a piston 53 with rod 54 and pressure head 55 bear upon the column under the action of an operating fluid admitted at 52 and withdrawn at 51.

In FIGS. 16–18 I have illustrated the possibility of applying the principles of this invention to a prismatic structure composed of interlinked columns of body sections defining the sides of different polygons. Thus, FIG. 16 shows three such columns of sections 102a, 102b, 102c whose ends are traversed by respective cables 1a, 1b, 1c, 1d, cables 1a and 1b also serving to interconnect the three columns in interleaved relationship of their respective sections. The cables are jointly tensionable by a device 60 generally similar to one shown in my aforementioned prior Patent No. 3,295,269. These three columns thus form a channel beam open on one side, in contradistinction to a triangular beam formed by three columns of sections 202a, 202b, 202c interconnected by cables 1a, 1b, 1c as shown in FIG. 17. Each of the sections of FIG. 17 has a reduced male and a bifurcate female end so that any set of three sections forms a complete polygon without interleaving. According to FIG. 18, a hexagonal beam is formed from columns of sections 302a through 302f interconnected by cables 1a through 1f.

In order to increase the rigidity of the stress-absorbing members heretofore described, their body sections may be internally reinforced by suitable spacers as has been illustrated in FIGS. 19–24. FIG 19 shows a column of tubular section $2^v$ axially traversed by a cable 1 which also passes through a set of spacers 56 each having the form of a double frustocone, the central ridge of each spacer bearing upon the inner periphery of a corresponding body section. In order to preserve the flexibility of the structure, the spacers are slightly shorter than the body sections so as to be axially separated from one another. In FIGS. 20 and 21 the spacers 56' are spherical, their diameter being slightly less than the axial length of the associated body sections $2^{vi}$; in FIG. 20 the spheres are centered within their respective body sections whereas in FIG. 21 they are aligned with the junctions between these sections, thereby increasing the shear strength of the structure. If necessary, compressible rubber washers or the like may be interposed between the spacers of FIGS. 19–21 to maintain their relative positions.

According to FIG. 22, the body sections $2^v$ are stiffened by spacers 58 in the form of large-diameter turns of a single coil spring separated by small-diameter turns 58a at the junctions of the body sections. Again, as shown in FIG. 21, the body sections and their spacers could also be relatively staggered. FIG. 23 shows a continuous spring 57 of uniform turn diameter bearing upon the inner peripheries of body sections $2^{vii}$ which, while otherwise similar to sections $2^v$, have beveled end faces positively interengaging one another for greater structural stability. FIG. 24 illustrates a continuous deformable spacer 59 common to several sections $2^v$.

FIG. 25, finally, illustrates the possibility of substituting a spring 43a for the elastic tube or hose 43 of FIGS. 13–15.

Tubes 43 and 59 may be made of any natural or synthetic elastomeric material. The solid spacers shown in FIGS. 19–21 advantageously consist of synthetic resin, such as polyvinyl chloride.

It is to be understood that compatible features from the various illustrated embodiments may be combined in a variety of ways and that other modifications, readily apparent to persons skilled in the art, are also intended to be embraced in the spirit and scope of my invention as defined in the appended claims.

I claim:

1. In a stress-absorbing structure, in combination, support means and a rigid elongate member mounted generally horizontally in said support means, said member comprising a multiplicity of rigid tubular body sections abutting one another in a row, resilient biasing means compressing said sections, said biasing means including a flexible tension cable extending through said sections from one end of said row to the other, said cable being anchored at one end of said elongate member, mechanism co-linear with said body sections for adjustably stressing same against said cable, said mechanism being spaced from said one end and resiliently deformable spacers having an axial passage of greater diameter than said cable traversed by the latter and disposed throughout the length of said body within said body sections in engagement with the inner peripheral surfaces thereof.

2. The combination defined in claim 1 wherein said member is provided with a pair of terminal elements anchored to said cable at opposite ends of said row and bearing upon said sections, said biasing means including a compressible link interposed between said terminal elements in series with said sections.

3. The combination defined in claim 1 wherein said spacers are groups of turns of a continuous coil spring.

4. The combination defined in claim 3 wherein said coil spring includes other turns of reduced diameter registering with the junctions between adjacent body sections.

5. The combination defined in claim 1 wherein said sections are of generally trapezoidal outline with the sides of the trapezoids abutting one another and converging toward a common center of curvature.

6. The combination defined in claim 1, further comprising automatic controller means coupled with said mechanism for adjusting the stress of said member in response to predetermined external conditions.

7. The combination defined in claim 1, further comprising a buffer element in series with said sections resisting compression under design loading stresses, said buffer element being yieldable in reponse to exceeding design loading stress loads.

8. The combination defined in claim 7 wherein said buffer element consists of relatively brittle material capable of collapsing under exceeding design loading stress loads.

References Cited

UNITED STATES PATENTS

| | | | |
|---|---|---|---|
| 870,429 | 11/1907 | Grimler | 52—726 |
| 1,005,471 | 10/1911 | Rendahl | 52—726 |
| 1,250,064 | 12/1917 | Whims | 52—113 |
| 1,939,968 | 12/1933 | Frei | 52—113 |
| 2,085,074 | 6/1937 | Boyles | 94—1.5 |
| 2,213,310 | 9/1940 | Gimenez et al. | 52—108 |
| 2,808,913 | 10/1957 | Frieder et al. | 52—726 |
| 3,295,699 | 1/1967 | Bauernschub | 52—108 |
| 3,349,526 | 10/1967 | Schuster | 52—108 |
| 3,349,531 | 10/1967 | Watson | 52—98 |
| 3,381,427 | 5/1968 | Watson | 52—98 |
| 2,085,074 | 6/1937 | Boyles | 94—1.5 X |
| 2,874,812 | 2/1959 | Clevett | 52—726 |
| 3,295,699 | 1/1967 | Bauernschub | 52—108 |
| 3,349,531 | 10/1967 | Watson | 52—98 |
| 3,381,427 | 5/1968 | Watson | 52—98 |

HENRY C. SUTHERLAND, Primary Examiner

U.S. Cl. X.R.

52—108, 227, 726